US009669365B2

(12) United States Patent
Werkheiser et al.

(10) Patent No.: US 9,669,365 B2
(45) Date of Patent: Jun. 6, 2017

(54) SUSPENSION PLASMA SPRAY APPARATUS AND USE METHODS

(71) Applicant: United Technologies Corporation, Hartford, CT (US)

(72) Inventors: William F. Werkheiser, East Hartford, CT (US); Brian T. Hazel, Avon, CT (US); John F. Blondin, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/735,211

(22) Filed: Jun. 10, 2015

(65) Prior Publication Data

US 2015/0361543 A1 Dec. 17, 2015

Related U.S. Application Data

(60) Provisional application No. 62/010,907, filed on Jun. 11, 2014.

(51) Int. Cl.
*B05B 1/24* (2006.01)
*B01F 3/12* (2006.01)
*B05B 7/22* (2006.01)
*B05B 7/14* (2006.01)
*B01D 3/00* (2006.01)
*B01F 11/00* (2006.01)
*H05H 1/42* (2006.01)
(Continued)

(52) U.S. Cl.
CPC ............ *B01F 3/1242* (2013.01); *B01D 3/006* (2013.01); *B01F 11/0094* (2013.01); *B05B 7/1445* (2013.01); *B05B 7/222* (2013.01);

*B05B 7/226* (2013.01); *C23C 4/10* (2013.01); *C23C 4/134* (2016.01); *H05H 1/42* (2013.01); *Y10T 29/49828* (2015.01)

(58) Field of Classification Search
CPC ......... C23C 4/127; C23C 4/105; C23C 4/124; C08K 3/28; C08K 3/22; C08K 2003/222; B05B 7/226; B05B 7/1445; B01F 11/0094; B01F 3/1242
USPC ............ 239/79, 80, 84, 85; 219/690, 121.36
See application file for complete search history.

(56) References Cited

U.S. PATENT DOCUMENTS

| 4,500,038 A * | 2/1985 | De Ferrari | ............ B05B 7/1404 118/312 |
| 2005/0133974 A1* | 6/2005 | Celikkaya | ............... C04B 35/10 266/216 |

(Continued)

FOREIGN PATENT DOCUMENTS

| DE | 102006047101 A1 | 4/2008 |
| WO | 2006/116844 A1 | 11/2006 |
| WO | 2008/036887 A2 | 3/2008 |

OTHER PUBLICATIONS

Turbomite CVT-P and CVT-S Series Turbine Vibrators, 2012, Cleveland Vibrator Company, Cleveland, Ohio.
(Continued)

*Primary Examiner* — Davis Hwu
(74) *Attorney, Agent, or Firm* — Bachman & LaPointe, P.C.

(57) ABSTRACT

A suspension plasma spray feeder apparatus for delivering a suspension from a suspension source to a plasma spray gun. The feeder apparatus comprises a suspension line and a vibrator mounted to vibrate the suspension line.

21 Claims, 2 Drawing Sheets

(51) Int. Cl.
C23C 4/134 (2016.01)
C23C 4/10 (2016.01)

(56) References Cited

U.S. PATENT DOCUMENTS

| | | | |
|---|---|---|---|
| 2008/0190034 A1* | 8/2008 | Rosenflanz | C03C 3/125 |
| | | | 51/307 |
| 2010/0098845 A1 | 4/2010 | Jensen et al. | |
| 2010/0243963 A1* | 9/2010 | Zehavi | B02C 4/02 |
| | | | 252/500 |

OTHER PUBLICATIONS

European Search Report for EP Patent Application No. 15171676.8, dated Oct. 29, 2015.

* cited by examiner

SUSPENSION PLASMA SPRAY APPARATUS AND USE METHODS

CROSS REFERENCE TO RELATED APPLICATION

Benefit is claimed of U.S. Patent Application Ser. No. 62/010,907, filed Jun. 11, 2014, and entitled "Suspension Plasma Spray Apparatus and Use Methods", the disclosure of which is incorporated by reference herein in its entirety as if set forth at length.

BACKGROUND

The disclosure relates to suspension plasma spray. More particularly, the disclosure relates to suspension plasma spray feeder apparatus.

Suspension plasma spray (SPS) is a form of plasma spray wherein a particulate suspended in a carrier liquid is delivered to the plasma spray gun. This may be distinguished, for example, from other systems wherein powder is fed directly into the gun to interact with plasma and any residual carrier gas or from non-powder systems (e.g., wire systems). Suspension plasma spray systems present issues of clogging not relevant to other spray systems. It has been known to use an orifice in the flowpath to control out feed rate and pressure of the output. Filters may be employed to prohibit large agglomerates or particles from building up in the flow path or reaching an orifice.

In some examples, a recirculating flowpath is used to prevent clogging when the gun is not spraying. For example, a valve is provided in a suspension supply line somewhere between a suspension source and the gun. The valve may shut off suspension flow to the gun. To prevent blockage upstream of the valve, a return line/flowpath is provided branching from the supply line/flowpath to the source just upstream of the valve. This return flowpath may have its own valve or, equivalently, the first valve may be a three-way valve. Thus, when the flow to the gun is shut off, flow along the branch flowpath is opened and flow can recirculate to avoid clogging. The branch flowpath may contain an orifice for providing a sufficient pressure restriction to limit the flow rate of the recirculating flow.

SUMMARY

One aspect of the disclosure involves a suspension plasma spray feeder apparatus for delivering a suspension from a suspension source to a plasma spray gun. The feeder apparatus comprises a suspension line and a vibrator mounted to vibrate the suspension line.

A further embodiment may additionally and/or alternatively include the suspension line being either: a suspension supply line for passing suspension from the suspension source to the plasma spray gun; or if present, a suspension recirculation line coupled to the suspension supply line to return suspension to the suspension source.

A further embodiment may additionally and/or alternatively include: the vibrator being a first vibrator mounted to vibrate the suspension supply line; the apparatus including the suspension recirculation line; and a second vibrator being mounted to vibrate the suspension recirculation line.

A further embodiment may additionally and/or alternatively include a purge fluid supply line being coupled to the suspension line and the vibrator being downstream of a junction of the purge fluid supply line.

A further embodiment may additionally and/or alternatively include the purge fluid supply line comprising a purge liquid supply line and a purge gas supply line.

A further embodiment may additionally and/or alternatively include the vibrator being an air vibrator.

A further embodiment may additionally and/or alternatively include the vibrator being a turbine vibrator.

A further embodiment may additionally and/or alternatively include the suspension line comprising a metallic member and the vibrator being clamped to the metallic member.

A further embodiment may additionally and/or alternatively include the vibrator being on or adjacent a filter housing or an orifice housing.

A further embodiment may additionally and/or alternatively include the vibrator being within 20 cm of a filter housing or an orifice housing.

A further embodiment may additionally and/or alternatively include a suspension plasma spray apparatus including the suspension plasma spray feeder apparatus. A plasma spray gun is coupled to the suspension line or adjacent an outlet of the suspension line.

A further embodiment may additionally and/or alternatively include a suspension supply coupled to the suspension supply line.

A further embodiment may additionally and/or alternatively include the suspension supply comprising ceramic particulate in an alcohol-based carrier.

A further embodiment may additionally and/or alternatively include a carrier gas supply coupled to the plasma spray gun.

A further embodiment may additionally and/or alternatively include a power line coupled to the plasma spray gun.

A further embodiment may additionally and/or alternatively include a method for manufacturing the suspension plasma spray feeder apparatus. The method comprises clamping the vibrator to the suspension line.

A further embodiment may additionally and/or alternatively include connecting the vibrator to an air supply.

A further embodiment may additionally and/or alternatively include the clamping being to or adjacent a filter housing or an orifice housing.

A further embodiment may additionally and/or alternatively include a method for using the suspension plasma spray feeder apparatus. The method comprises: detecting a pressure parameter; and responsive to the detected pressure parameter, running the vibrator.

A further embodiment may additionally and/or alternatively include: the suspension line being a suspension supply line; the vibrator being a first vibrator mounted to vibrate the suspension supply line; a suspension recirculation line branching from the suspension supply line; and a second vibrator being mounted to vibrate the suspension recirculation line.

A further embodiment may additionally and/or alternatively include the running of the vibrator comprising delivering compressed air to the vibrator.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
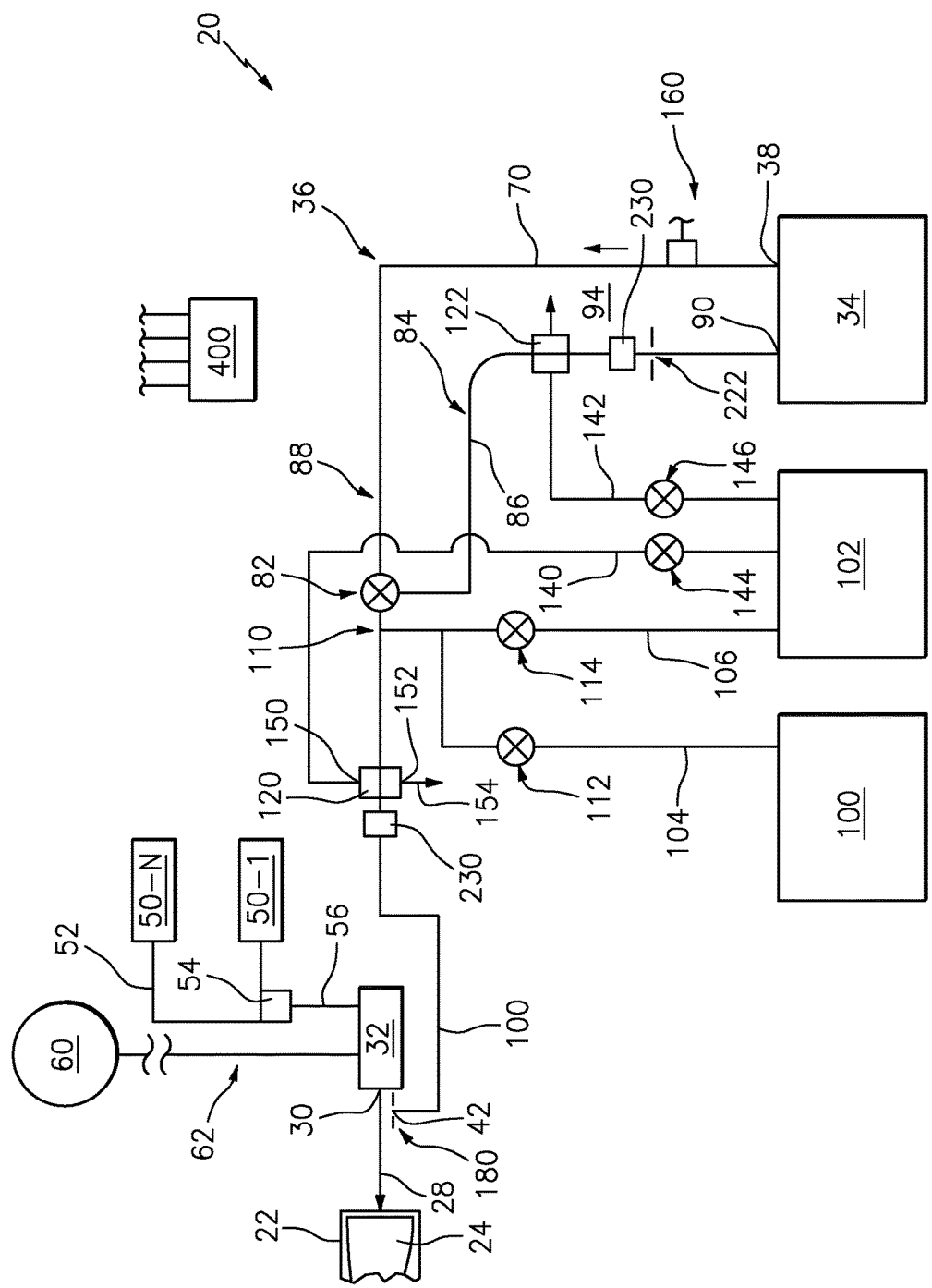
FIG. 1 is a schematic view of a suspension plasma spray apparatus.

FIG. 1 shows a suspension plasma spray system (SPS) 20 for applying a coating 22 to a workpiece 24. The exemplary workpiece 24 is a gas turbine engine component such as a blade, vane, combustor panel, outer air seal, or the like. An exemplary workpiece includes a metallic substrate which may be formed of an exemplary alloy such as a nickel-based superalloy. The substrate may bear one or more additional coating layers which may have been applied by SPS or other techniques (e.g., bond coats and the like). Exemplary coatings are ceramic coatings. Exemplary ceramic coatings are zirconia-based coatings such as yttria-stabilized zirconia (YSZ) and gadolinia-stabilized zirconia (GSZ). Exemplary coatings are discharged as a spray 28 carried by plasma discharge from an outlet 30 of a plasma gun 32.

The system 20 includes a suspension source 34. The exemplary source 34 may contain a reservoir of a mixture of coating particles and a liquid carrier suspending the particles. Other variations may involve mixing the particles and the carrier at the source. The suspension source 34 may include items such as: one or more pumps and/or gas sources (e.g., air, Ar, and/or $N_2$) for pressurizing the suspension to drive suspension flow from the suspension source to the gun; meters; sensors; valves; diagnostic hardware; and the like. As noted above, exemplary particles are of a ceramic such as a zirconia-based ceramic (e.g., at least 50% zirconia by weight). Exemplary liquid carrier is alcohol-based (e.g., at least 50% alcohol by weight).

A flowpath (suspension supply flowpath) 36 extends from an outlet 38 of the suspension source 34 to a suspension 42 outlet. The exemplary outlet is external to the gun suspension outlet so that a suspension flow along the flowpath 36 may mix with carrier gas and/or associated plasma to be propelled as the spray 28. FIG. 1 shows plural gas sources 50-1 to 50-N of gases such as argon, helium, nitrogen, hydrogen, and the like as may be appropriate for the desired chemistry and physics of the particular gun and spray. These may have associated gas lines 52 and associated flowpaths extending to a mixer 54 which may include appropriate valves and the like for mixing in desired proportions. A line 56 extends from the mixer to the gun. FIG. 1 further shows a power source 60 coupled to the gun by wiring 62 to provide energy for generating the plasma.

Alternative guns may integrate the suspension line into the gun body such that the mixing of the suspension with the plasma and carrier gas is internal to the gun (e.g., via internal outlets of each) with the mixture then leaving an overall outlet of the gun.

FIG. 1 further shows a suspension supply line 70 extending along the flowpath 36 from the suspension source outlet 38 to the gun inlet 42. One or more valves 82 may be located along the suspension supply line and used as discussed below.

This represents a basic system for performing SPS. As with prior art systems, a metering orifice 180 could be placed at or near the outlet 42. One or more filters may be located along the flowpath 36 to prevent agglomerates/large particles from plugging the orifice or building up in undesirable locations. As is discussed further below, proximate the orifice and/or the filter one may locate a vibrator to reduce any plugging buildup.

As an optional variation, the exemplary system 20 adds a recirculation flowpath (return flowpath) 84 comprising a suspension recirculation line (return line) 86 extending from a junction 88 with the supply flowpath 36 to an inlet or return port 90 of the suspension source 34. An exemplary valve 82 is a three-way for controlling flow along the return flowpath 84 in addition to flow along the supply flowpath.

Recirculation by directing a return flow along the flowpath 84 may be used to prevent stagnation of the suspension and associated clogging. However, the use of a vibrator along the line 70/flowpath 36 may reduce the need for and advantages of such recirculation by preventing settling of suspended particulate in the line 70/flowpath 36.

In one example where recirculation is present, the flowpath 84 is used only when the gun is not in operation. In this example, when the gun is in operation, flow proceeds from the suspension source outlet 38 along the flowpath 36 to and through the gun. When the gun is not in use, the valve 82 may be closed/shut. This closing/shutting may be in addition to closing/shutting of a valve (not shown) at the gun. For example, the gun valve may be closed only for relatively short durations during a spray process while the valve 82 may shut the supply flowpath for longer durations of gun non-use. With the valve 82 shutting/closing the supply flowpath, it is desired to prevent stagnation in the portion of the suspension supply flowpath 36 extending between the suspension source outlet 38 and the valve 82. This may be achieved by configuring the valve 82 to enable a return flow along the flowpath 84. The result is that suspension will continue to recirculate in a loop 94 and will tend not to become stagnant and thus not clog the line 70. Thus, with the recirculation system the valve 82 (which might be replaced by multiple valves) is configured to provide at least two conditions: a gun-off condition wherein flow recirculates along the loop 94 but flow from upstream to downstream of the valve along the supply flowpath 36 is blocked; and a gun-on condition wherein flow from upstream to downstream along the supply flowpath is permitted. In various implementations, this latter condition may or may not include flow through the recirculation line.

The exemplary embodiment also provides a flush action for flushing the line 70 downstream of the valve 82. In the aforementioned example, when the valve 82 is shut, the gun valve, if any, may be reopened and a purge fluid driven through the portion of the line 70 and associated flowpath 36 downstream of the valve 82. An exemplary purge fluid comprises sequential introduction of a purge liquid (e.g., water or water-based solution) for cleaning and a purge gas (e.g., air) for drying. Accordingly, FIG. 1 further shows a water supply 100 and an air supply 102. The supplies 100 and 102 may be portions of or otherwise incorporate existing factory deionized water and compressed air systems but may include the addition of appropriate valving, sensors, and the like. FIG. 1 further shows water and air lines 104 and 106 merging and joining the flowpath 36 and line 70 at a junction 100. The exemplary junction 100 is just downstream of the valve 82. Valves 112 and 114 are shown for controlling respective flows of water and air.

As noted above, key plugging points include the filter(s) and orifice(s). Filters can be anywhere along the flowpath 36. Exemplary locations are just after the reservoir and before any restrictions (e.g., the orifice) as this captures the large particles and prevents them from plugging the whole flow path. Orifice are used to meter flow on and flowpath. One exemplary orifice 180 is along the flowpath 36 (e.g., at near the outlet 42 and possibly internal to the gun if mixing occurs in the gun). Another exemplary orifice 222 is somewhere along the recirculation flowpath. Screens 230, 220 are also shown in the supply and recirculation lines.

As was mentioned above, yet further means are provided for reducing/limiting/relieving suspension clogging in the system. These means include one or more vibrators 120, 122.

In the exemplary system including a recirculation path 84 and associated flow loop 94, one of the vibrators 122 is along the loop 94 while the other 120 is along the flowpath 36 downstream of the valve 82 (i.e., outside the loop 94). In this particular embodiment, the vibrator 122 along the loop 94 is along the return flowpath 84 and line 86.

The exemplary vibrator is an air vibrator. An exemplary air vibrator is an air turbine vibrator. An exemplary air turbine vibrator is the CVT-P-10 of Cleveland Vibrator Company of Cleveland, Ohio. Air vibrators may, thus, be connected to the same air supply 102 as is used to supply air to other components. FIG. 1 shows respective air supply lines 140 and 142 for the two vibrators each with a control valve 144, 146. Each of the exemplary vibrators has an inlet 150 coupled to the associated line 140, 142 and an outlet 152. The outlet 152 is exposed to the factory environment and, when the vibrator is operational, discharges an outlet air stream 154.

Numerous control protocols for the vibrators are possible. A most basic system keeps them running all the time. Other variations may have them running on a timer for discrete intervals. Yet more involved implementations engage the vibrators responsive to sensed or calculated conditions. For example, partial blockage in the system may cause pressure changes. These changes may be sensed and the vibrators actuated in response. FIG. 1 shows an exemplary pressure sensor 160 relatively upstream along the suspension supply line and flowpath. A partial blockage downstream of the sensor may cause an increase in pressure measured by the sensor. Responsive to this sensed increase, the vibrators could be actuated. Both vibrators may be simultaneously actuated or, depending upon the operational situation only one may be actuated even in situations where there are two or more vibrators. Yet other implementations involve pressure sensors wherein a pressure drop at the sensor indicates a blockage upstream of the sensor and, thereby, triggers vibration to clear lines of partial blockage.

FIG. 1 further shows a controller 400. The controller may receive user inputs from an input device (e.g., switches, keyboard, or the like) and sensors (not shown, e.g., pressure sensors, flow meters, temperature sensors, and the like at various system locations). The controller may be coupled to the sensors and controllable system components (e.g., valves, pumps, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

Figure 2:
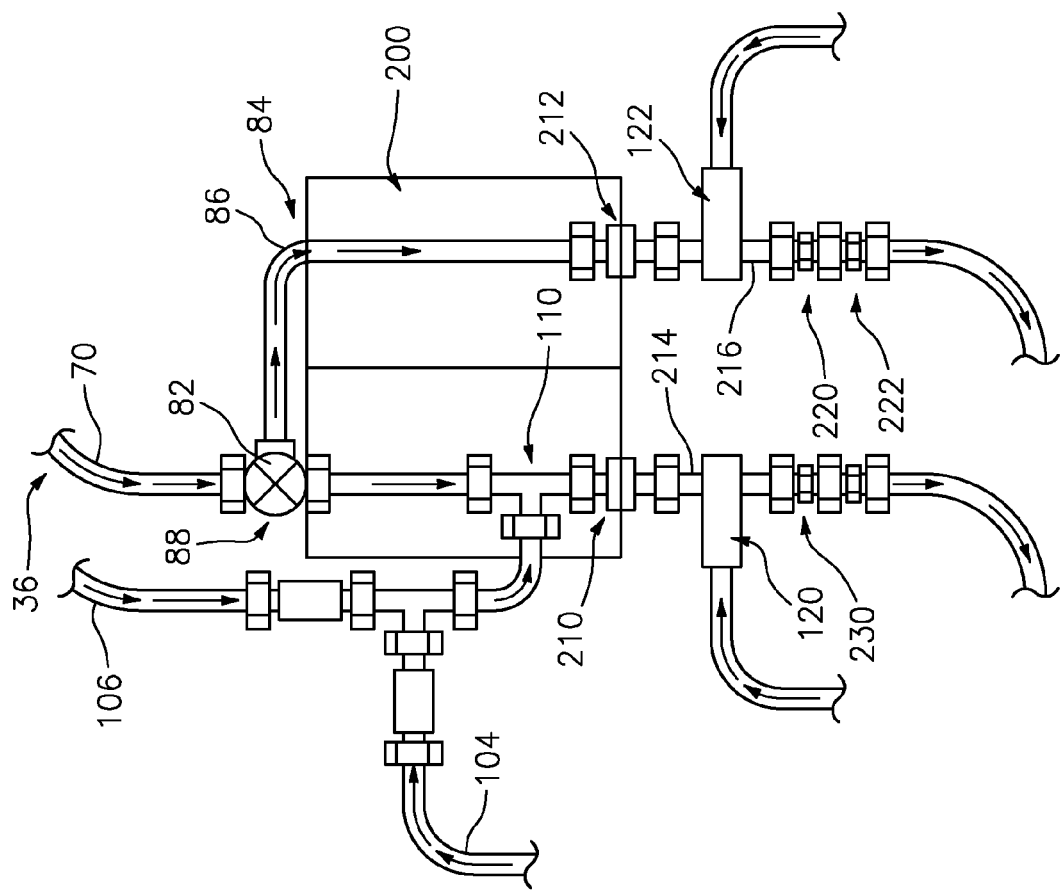
FIG. 2 is a view of a feeder of the apparatus of FIG. 1.

FIG. 2 shows further details of an exemplary feeder system (subsystem) within the suspension plasma spray system 20 of FIG. 1. Components are held by a bracket or housing structure (support) 200 and the exemplary orientation is illustrated as would be present in the factory with the flowpath 36 and line 70 approaching from above and departing below. A housing of the exemplary valve 82 provides the junction 88. The exemplary valve housing may be rigidly mounted to the support 200. Along the flowpaths 36 and 84 downstream of the junction 88, the associated lines may include respective bulkhead unions 210, 212 engaging the support 200. Metallic tube extensions 214, 216 may rigidly depend from the unions and provide a robust line segment for which to mate the associated vibrator.

In this embodiment, an inline screen or filter assembly 220 is immediately downstream of the tube 216 and an orifice assembly 222 is immediately downstream of the screen assembly 220. The orifice and screen are particularly susceptible to clogging. Accordingly, this implementation provides vibration advantageously close to the potential clog location. Also, this configuration using metallic fittings along this location helps translate that vibration. Other line portions (e.g., downstream of the orifice assembly 222 and upstream of the bulkhead union 212) may more appropriately be flexible polymeric tubing allowing easy routing and movement.

Similarly to the proximity of the vibrator 122 to the screen assembly 220, the vibrator 120 is proximate a screen assembly 230. In both cases, the proximity may mean on the housing of the screen/filter or orifice or appropriately adjacent thereto. With polymeric tubing instead of exemplary metal (e.g., stainless steel), clamping of the vibrator to the polymeric tubing may have a closer desired proximity than with metal tubing. Exemplary proximity places the vibrator housing within 20 cm (more narrowly 10 cm or 5 cm) of the housing of the screen/filter or orifice and within 25 cm (more narrowly 12 cm or 8 cm) of the actual screen/filter media or orifice aperture. Nevertheless, more remote vibrator locations may still have a general benefit. In both illustrated cases the vibrator is upstream of the associated screen/filter or orifice. This has some benefit of helping break up agglomerations prior to reaching the element and being closer to the upstream side of the element where plugging is likely to develop. However, downstream locations are also possible, particularly in retrofit situations if space is more available downstream.

Figure 3:
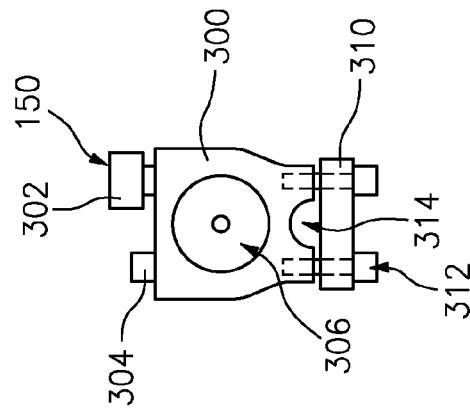
FIG. 3 is a view of a vibrator for use with the feeder of FIG. 2.

FIG. 3 shows further details of the exemplary vibrator. The vibrator includes a main body 300 with the inlet 150 being formed along an inlet fitting 302 to the body. The outlet 152 is formed along a muffler 304 attached to the body. The body contains a turbine schematically shown as 300. A clamp 310 is matable to the body (e.g., via fasteners such as cap screws 312). The clamp and body define a space for capturing the associated line (e.g., a groove 314 in the body facing the clamp). Accordingly, in assembly (original manufacture or retrofit) a technician may place the clamp body adjacent the line with the groove 314 partially receiving the associated segment of line. The clamp 310 may be put in place and the cap screws inserted and tightened to securely mount the vibrator to the associated line.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for using a suspension plasma spray feeder apparatus for delivering a suspension from a suspension source to a plasma spray gun, the feeder apparatus comprising:
   a suspension line; and
   a vibrator mounted to vibrate the suspension line,
the method comprising:
   detecting a pressure parameter; and
   responsive to the detected pressure parameter, running the vibrator.

2. The method of claim 1 wherein the suspension line is either:
   a suspension supply line for passing suspension from the suspension source to the plasma spray gun; or
   if present, a suspension recirculation line coupled to the suspension supply line to return suspension to the suspension source.

3. The method of claim 2 wherein:
   the vibrator is a first vibrator mounted on the suspension supply line;
   the apparatus includes the suspension recirculation line; and
   a second vibrator is mounted on the suspension recirculation line.

4. The method of claim 2 wherein:
   a purge fluid supply line is coupled to the suspension line; and
   the vibrator is downstream of a junction of the purge fluid supply line.

5. The method of claim 4 wherein:
   the purge fluid supply line comprises a purge liquid supply line and a purge gas supply line.

6. The method of claim 1 wherein:
   the vibrator is an air vibrator.

7. The method of claim 1 wherein:
   the vibrator is a turbine vibrator.

8. The method of claim 1 wherein:
   the suspension line comprises a metallic member; and
   the vibrator is clamped to the metallic member.

9. The method of claim 1 wherein:
   the vibrator is on or adjacent a filter housing or an orifice housing.

10. The method of claim 1 wherein:
    the vibrator is within 20 cm of a filter housing or an orifice housing.

11. The method of claim 1 being a method for using a suspension plasma spray apparatus including the suspension plasma spray feeder apparatus, the suspension plasma spray apparatus further comprising:
    a plasma spray gun coupled to the suspension line or adjacent an outlet of the suspension line.

12. The method of claim 11 wherein the suspension plasma spray apparatus further: comprises:
    a suspension supply coupled to the suspension supply line.

13. The method of claim 12 wherein:
    the suspension supply comprises ceramic particulate in an alcohol-based carrier.

14. The method of claim 12 wherein the suspension plasma spray apparatus further: comprises:
    a carrier gas supply coupled to the plasma spray gun.

15. The method of claim 12 wherein the suspension plasma spray apparatus further: comprises:
    a power line coupled to the plasma spray gun.

16. The method of claim 1, wherein:
    the vibrator is clamped to the suspension line.

17. The method of claim 16 further comprising:
    the vibrator is connected to an air supply.

18. The method of claim 16 wherein:
    the vibrator is clamped to the suspension line to or adjacent a filter housing or an orifice housing.

19. The method of claim 1 wherein:
    the suspension line is a suspension supply line;
    the vibrator is a first vibrator mounted to vibrate the suspension supply line;
    the apparatus includes a suspension recirculation line branching from the suspension supply line; and
    a second vibrator is mounted to vibrate the suspension recirculation line.

20. The method of claim 1 wherein:
    the running of the vibrator comprises delivering compressed air to the vibrator.

21. The method of claim 1 wherein:
    the suspension line carries a suspension of particulate in a carrier liquid.

* * * * *